United States Patent
Webb et al.

(10) Patent No.: US 11,708,486 B2
(45) Date of Patent: Jul. 25, 2023

(54) ACRYLONITRILE BUTADIENE STYRENE COPOLYMER/LIGNIN BLENDS

(71) Applicant: Prisma Renewable Composites, LLC, Knoxville, TN (US)

(72) Inventors: Christopher D. Webb, Knoxville, TN (US); William M. Sanford, Knoxville, TN (US); Adam A. McCall, Knoxville, TN (US)

(73) Assignee: Prisma Renewable Composites, LLC, Knoxville, TN (US)

( * ) Notice: Subject to any disclaimer, the term of this patent is extended or adjusted under 35 U.S.C. 154(b) by 207 days.

(21) Appl. No.: 16/663,497

(22) Filed: Oct. 25, 2019

(65) Prior Publication Data
US 2020/0131359 A1    Apr. 30, 2020

Related U.S. Application Data

(60) Provisional application No. 62/752,001, filed on Oct. 29, 2018.

(51) Int. Cl.
*C08L 55/02* (2006.01)
*C08J 3/20* (2006.01)

(52) U.S. Cl.
CPC ............... *C08L 55/02* (2013.01); *C08J 3/201* (2013.01); *C08L 2205/025* (2013.01); *C08L 2205/03* (2013.01); *C08L 2205/08* (2013.01)

(58) Field of Classification Search
CPC ............ C08L 1/00–32; C08L 3/00–20; C08L 5/00–16; C08L 55/02
See application file for complete search history.

(56) References Cited

U.S. PATENT DOCUMENTS

| 8,748,537 | B2 | 6/2014 | Naskar et al. |
| 9,453,129 | B2 | 9/2016 | Naskar |
| 9,815,985 | B2 | 11/2017 | Naskar et al. |
| 2017/0015828 | A1* | 1/2017 | Naskar ................. C08L 9/02 |
| 2018/0072889 | A1* | 3/2018 | Ying ................. C08L 23/06 |
| 2019/0225809 | A1 | 7/2019 | Naskar et al. |

FOREIGN PATENT DOCUMENTS

| CN | 103059499 A  * | 4/2013 |
| CN | 107226993 A | 10/2017 |
| DE | 102014215627 A1 * | 2/2016 |

OTHER PUBLICATIONS

CN 103059499 A machine translation (Apr. 2013).*
Song et al., Journal of Macromolecular Science, Part B:Physics, 51:4, 720-735 (2012).*
DE 102014215627 A1 machine translation (Feb. 2016).*
Matuana et al, "Composites of Acrylonitrile-Butadiene-Styrene Filled with Wood-Flour" Polymers & Polymer Composites, vol. 15, No. 5, 2007 pp. 365-370 (2007).*
European Patent Office, Examination Report issued in EP 192057818 dated Sep. 9, 2021.
European Patent Office, Extended Search Report issued in EP 19205781.8 dated Mar. 10, 2020, 21 pages.

* cited by examiner

*Primary Examiner* — Ana L. Woodward
(74) *Attorney, Agent, or Firm* — Wood Herron & Evans LLP

(57) ABSTRACT

A thermoplastic acrylonitrile-butadiene-styrene copolymer/lignin blend is provided, whereas the blend comprises (i) an amount of acrylonitrile-butadiene-styrene copolymer; (ii) an amount of lignin; and (iii) an amount of compatibilizing agent capable of imparting improved ductility and impact strength to the resultant blend. Methods of improving impact strength and ductility of a thermoplastic acrylonitrile-butadiene-styrene copolymer/lignin blend and articles made therefrom are also disclosed.

16 Claims, No Drawings

ACRYLONITRILE BUTADIENE STYRENE COPOLYMER/LIGNIN BLENDS

TECHNICAL FIELD

The present invention relates generally to acrylonitrile-butadiene-styrene copolymer/lignin blends and, more specifically, to improved thermoplastic composites of acrylonitrile-butadiene-styrene copolymer and lignin and methods of making the same having enhanced ductility and impact properties.

BACKGROUND

Copolymers of acrylonitrile, butadiene, and styrene, known as ABS plastics, are a useful family of thermoplastic resins with broad applications in automotive, marine, home appliance, toys and other industries. Lignin has been proposed as a useful additive to ABS plastics to provide increased stiffness and reduced cost. Additionally, since lignin is a natural product, its incorporation in plastics like ABS adds renewable content and reduces the environmental impact of these materials. However, lignin is generally incompatible with ABS polymers, forming large domains of lignin with poor interfacial adhesion with the ABS matrix. This morphology leads to significant reductions in the impact strength and ductility of the resulting composite, thereby limiting their practical utility.

It thus would be beneficial to provide improved thermoplastic acrylonitrile-butadiene-styrene copolymer/lignin blends and methods of making the same, such as for automotive use, that have enhanced ductility and impact properties so as to overcome one or more of the aforementioned drawbacks of current ABS/lignin blends.

SUMMARY OF THE INVENTION

In a first example, a thermoplastic acrylonitrile-butadiene-styrene copolymer/lignin blend is provided, the blend comprising: (i) an amount of acrylonitrile-butadiene-styrene copolymer; (ii) an amount of lignin; and (iii) an amount of compatibilizing agent capable of imparting improved ductility and impact strength to the resultant blend.

In one example, the lignin is a Kraft lignin. In another example, the lignin is an organosolv lignin.

In one example, alone or in combination with any one of the previous examples, the compatibilizing agent can be one or more of polyalkylene oxides, ether-containing copolymers, polyalkyl-maleic anhydride copolymers, vinyl-maleic anhydride copolymers, polyalkylhydroxyl copolymers, and olefin-vinyl acetate copolymers. In another example, alone or in combination with any of the previous examples, the polymeric compatibilizing agent is one or more of a polyvinyl alcohol, polyvinyl acetate, a copolymer of ethylene and vinyl acetate, a copolymer of ethylene, vinyl acetate and carbon monoxide, a maleic anhydride grafted copolymer of ethylene and vinyl acetate, a maleic anhydride grafted acrylonitrile-butadiene-styrene copolymer, and a copolymer of styrene and maleic anhydride.

In another example, alone or in combination with any of the previous examples, the compatibilizing agent can be selected from one or more of acrylonitrile-butadiene copolymer (also known as nitrile rubber), an acrylonitrile-butadiene-styrene copolymer having a butadiene content of at least 50% by weight, polyethylene glycol, and maleic anhydride. In one example, the combination of compatibilizing agents can include an acrylonitrile-butadiene copolymer, an acrylonitrile-butadiene-styrene copolymer having a butadiene content of at least 50% by weight, and polyethylene glycol with a molecular weight between about 5,000 and 50,000. In another example, the combination of compatibilizing agents can include an acrylonitrile-butadiene copolymer, an acrylonitrile-butadiene-styrene copolymer with a butadiene content of at least 50% by weight, and maleic anhydride.

In a second example, a method for improving the ductility and/or impact strength of an article comprising acrylonitrile-butadiene-styrene and lignin is provided, the method comprising: melt blending: i) an amount of thermoplastic acrylonitrile-butadiene-styrene (ABS) copolymer; ii) an amount of lignin; and iii) a compatibilizing agent; forming a substantially homogeneous blend of (i)-(iii); and forming an article from the substantially homogeneous blend; wherein the article has at least 50% greater impact strength and 50% greater elongation at break than an article of the ABS copolymer and lignin, at the same relative ratios, respectively, without the presence of the compatibilizing agent.

In one example, the lignin is a Kraft lignin. In another example, the lignin is an organosolv lignin.

In one example, alone or in combination with any one of the previous examples, the compatibilizing agent is one or more of polyalkylene oxides, ether-containing copolymers, polyalkyl-maleic anhydride copolymers, vinyl-maleic anhydride copolymers, polyalkylhydroxyl copolymers, and olefin-vinyl acetate copolymers. In another example, alone or in combination with any of the previous examples, the polymeric compatibilizing agent is one or more of a polyvinyl alcohol, polyvinyl acetate, a copolymer of ethylene and vinyl acetate, a copolymer of ethylene, vinyl acetate and carbon monoxide, a maleic anhydride grafted copolymer of ethylene and vinyl acetate, a maleic anhydride grafted acrylonitrile-butadiene-styrene copolymer, and a copolymer of styrene and maleic anhydride.

In another example, alone or in combination with any of the previous examples, the compatibilizing agent can be selected from one or more of acrylonitrile-butadiene copolymer (also known as nitrile rubber), an acrylonitrile-butadiene-styrene copolymer having a butadiene content of at least 50% by weight, polyethylene glycol, and maleic anhydride. In one example, the combination of compatibilizing agents can include an acrylonitrile-butadiene copolymer, an acrylonitrile-butadiene-styrene copolymer having a butadiene content of at least 50% by weight, and polyethylene glycol with a molecular weight between about 5,000 and 50,000. In another example, the combination of compatibilizing agents can include an acrylonitrile-butadiene copolymer, an acrylonitrile-butadiene-styrene copolymer with a butadiene content of at least 50% by weight, and maleic anhydride.

In another example, alone or in combination with any one of the previous examples, the compatibilizing agent comprises from about 0.5 to 25% by weight of the total weight of the blend. In another example, alone or in combination with any one of the previous examples, the acrylonitrile-butadiene-styrene copolymer/lignin blend exhibits an impact strength of at least 5 kJ/m$^2$ and an elongation at break of at least 2%.

In a third example, a composite article is provided comprising the acrylonitrile-butadiene-styrene copolymer/lignin blend.

In a fourth example, a method for preparing a thermoplastic acrylonitrile-butadiene-styrene/lignin copolymer composite is provided, the method comprising: melt blending: i) a thermoplastic acrylonitrile-butadiene-styrene (ABS)

copolymer; ii) lignin; and iii) a compatibilizing agent; and forming a composite article, wherein the composite article has an impact strength of at least 2 kJ/m$^2$ and an elongation at break of at least 2%. In one example, a composite article manufactured according to the fourth example is provided.

The features and objectives of the present invention will become more readily apparent from the following Detailed Description.

DETAILED DESCRIPTION OF SPECIFIC EMBODIMENTS

The present disclosure relates to compositions and a method to produce improved composites of ABS and lignin with enhanced ductility and impact properties vs prior art through the use of appropriate compatibilizing agents and compounding techniques.

The presently disclosed thermoplastic polymer blend comprises (i) ABS polymer component, (ii) lignin component, and at least one compatibilizing agent (component iii).

ABS Copolymer

"Acrylonitrile butadiene styrene" and "ABS" are used interchangeably herein. The ABS can have any of a wide range of weight-average molecular weights (Mw), such as precisely, about, at least, above, up to, or less than, for example, 2,500 g/mol, 3,000 g/mol, 5,000 g/mol, 10,000 g/mol, 50,000 g/mol, 100,000 g/mol, 150,000 g/mol, 200,000 g/mol, 300,000 g/mol, 400,000 g/mol, 500,000 g/mol, or 1,000,000 g/mol, or a molecular weight within a range bounded by any two of the foregoing exemplary values. The ABS may also have any of a wide range of number-average molecular weights Mn, wherein Mn can correspond to any of the numbers provided above for Mw. The ABS can be from any commercial supplier.

For purposes of the disclosure, the ABS has an acrylonitrile content of at least 15 mol %. In different embodiments, the ABS has molar proportions of about 15 mol % to about 50 mol % acrylonitrile, about 5 mol % to about 30 mol % butadiene about 40 mol % to about 60 mol % styrene, or a range bounded by any three of the foregoing values.

In the polymer blend material, the lignin component (ii) is present in an amount of at least 5 wt % and up to about 50 wt % by total weight of components (i) and (iii). As both components (i) and (ii) are present in the polymer blend, each component must be in an amount less than 100 wt %. In some examples, the lignin component is present in the polymer blend material in an amount of about 5 wt %, 10 wt %, 15 wt %, 20 wt %, 25 wt %, 30 wt %, 35 wt %, 40 wt %, 45 wt %, or 50, wt %, or in an amount within a range bounded by any two of the foregoing exemplary values, e.g., at least or above 5 wt %, 7 wt %, or 10 wt %, and up to 15 wt %, 20 wt %, or 25 wt % by total weight of components (i) and (ii). In more particular embodiments, the lignin component is present in an amount of 10 wt %, or 15 wt %, or 20 wt %, or 25 wt %, or 30 wt %, and up to 35 wt % by total weight of components (i) and (ii).

Lignin

Any commercially available lignin may be used. In one example, the lignin source can be from commercial feedstocks such as switchgrass, hybrid and tulip poplar, and corn stover components including any variety, cultivar, hybrid or derivatives thereof. In another example, the lignin source may be any variety, cultivar, hybrid or derivative thereof from Miscanthus, Miscane and Wide Hybrids thereof, Sugar Cane, Energy Cane, Short Rotation Hardwood Crops (e.g., Poplar, Cottonwood, Aspen), Sorghum (including Biomass Sorghum, Sorghum Sudan, Sweet Sorghum), Hemp, Agricultural Residues (including Wheat Straw, Rice Hulls, Sugarcane Bagasse), Eucalyptus, Native Warm Season Grasses (including Bluestem, Fescue, Elephant Grass), Pine, Ash, Balsam Fir, Basswood, Beech, Birch, Blackgum, Boxelder, Buckeye, Butternut, Catalpa, Cedar, Cherry, Coffee Tree, Cucumber, Cypress, Elm, Fir, Gum, Hackberry, Hemlock, Hickory, Hop Hornbeam, Larch, Locust, Maple, Oak, Persimmon, Redbay, Sassafras, Sourwood, Spruce, Sugarberry, Sweetgum, Sycamore, Tamarack, Walnut, Water Tupelo, and Willow. Besides the natural variation of lignins, there can be further compositional variation based on the manner in which the lignin has been processed.

For example, the lignin can be a Kraft lignin, sulfite lignin (i.e., lignosulfonate), or a sulfur-free lignin. As known in the art, a Kraft lignin refers to lignin that results from the Kraft process. In the Kraft process, a combination of sodium hydroxide and sodium sulfide (known as "white liquor") is reacted with lignin present in biomass to form a dark-colored lignin bearing thiol groups. Kraft lignins are generally water- and solvent-insoluble materials with a high concentration of phenolic groups. They can typically be made soluble in aqueous alkaline solution. As also known in the art, sulfite lignin refers to lignin that results from the sulfite process. In the sulfite process, sulfite or bisulfate (depending on pH), along with a counterion, is reacted with lignin to form a lignin bearing sulfonate (SO$_3$H) groups. The sulfonate groups impart a substantial degree of water-solubility to the sulfite lignin. There are several types of sulfur-free lignins known in the art, including lignin obtained from biomass conversion technologies (such as those used in ethanol production), solvent pulping (i.e., the "organosolv" process), and soda pulping. In particular, organosolv lignins are obtained by solvent extraction from a lignocellulosic source, such as chipped wood, followed by precipitation. Due to the significantly milder conditions employed in producing organosolv lignins (i.e., in contrast to Kraft and sulfite processes), organosolv lignins are generally more pure, less degraded, and generally possess a narrower molecular weight distribution than Kraft and sulfite lignins. These lignins can also be thermally devolatilized to produce a variant with less aliphatic hydroxyl groups, and molecularly restructured forms with an elevated softening point. Any one or more of the foregoing types of lignins may be used (or excluded) as a component in the method described herein for producing a polymer blend.

In one example, the less harsh and damaging organosolv process can be used for delignification (i.e., as compared to using strong acid or base), so as to provide a lignin providing higher value-added applications, including manufacturing of the presently disclosed polymer blends.

Compatibilizing Agent

The polymer blend material described herein includes a component other than the components (i) and (ii). In one example, the compatibilizing agent can be a polymeric compatibilizing agent. The compatibilizing agent can assist in the dispersion and/or distribution and/or miscibility of one component with or within the other component. In one example, the compatibilizing agent can modify the physical properties (e.g., impact strength, tensile strength, modulus, and/or elongation at break). Example of suitable compatibilizing agents include, for example, ether-containing polymers (e.g., polyalkylene oxides), ether-containing copolymers, polyalkyl-maleic anhydride copolymers, vinyl-maleic anhydride copolymers, polyalkylhydroxyl copolymers, olefin-vinyl acetate copolymers, ABS-maleic anhydride copolymers. Other examples of compatibilizing agents include polyethylene oxide, polyvinyl alcohol, polyvinyl acetate, ethylene vinylacetate copolymer, ethylene-vinyl acetate-carbon monoxide copolymer, styrene-maleic anhydride copolymer, polybutyl-maleic anhydride copolymer, maleic anhydride grafted acrylonitrile-butadiene-styrene copolymer, and maleic anhydride grafted ethylene-vinylacetate copolymer, polyethylene glycol or a copolymer thereof, polyethylene oxides, polypropylene oxides, polybutylene oxides, and copolymers thereof or with ethylene, propylene, or allyl glycidyl ether, and may additionally contain solvents or plasticizers in combination with the aforementioned compatibilizing agents. Other examples of compatibilizing agents include an acrylonitrile-butadiene copolymer (also known as nitrile rubber), an acrylonitrile-butadiene-styrene copolymer having a butadiene content of butadiene at least 50% by weight, polyethylene glycol, and maleic anhydride. In one example, the compatibilizing agent is a copolymer of butadiene and acrylonitrile, a copolymer of styrene and acrylonitrile, or mixtures thereof. In one example, polyethylene oxide having an average molecular weight of between about 100,000 and 5,000,000 can be used. In another example, polyethylene glycol having a molecular weight of between about 5,000 and 50,000 can be used. In another example, polyethylene glycol having a molecular weight of between about 7,000 and 40,000 or between about 10,000 and 20,000 can be used. In still another example, polyethylene glycol having a molecular weight of between about 7,000 and 10,000 or between about 20,000 and 40,000 can be used. In one example, the combination of compatibilizing agents can include an acrylonitrile-butadiene copolymer, an acrylonitrile-butadiene-styrene copolymer having a butadiene content of at least 50% by weight, and polyethylene glycol with a molecular weight between about 5,000 and 50,000. In another example, the combination of compatibilizing agents can include an acrylonitrile-butadiene copolymer, an acrylonitrile-butadiene-styrene copolymer with a butadiene content of at least 50% by weight, and maleic anhydride.

As a compatibilizing agent, the acrylonitrile-butadiene-styrene (ABS) copolymer having a butadiene content of butadiene at least 50% by weight can have any of a wide range of weight-average molecular weights (Mw), such as precisely, about, at least, above, up to, or less than, for example, 2,500 g/mol, 3,000 g/mol, 5,000 g/mol, 10,000 g/mol, 50,000 g/mol, 100,000 g/mol, 150,000 g/mol, 200,000 g/mol, 300,000 g/mol, 400,000 g/mol, 500,000 g/mol, or 1,000,000 g/mol, or a molecular weight within a range bounded by any two of the foregoing exemplary values. The ABS may also have any of a wide range of number-average molecular weights Mn, wherein Mn can correspond to any of the numbers provided above for Mw. The ABS here can be from any commercial supplier. The ABS also has a butadiene content of at least 50% by weight and, in another example, the butadiene content can be at least 55%, 60%, 65%, 70%, 75%, or 80%. The acrylonitrile-butadiene copolymer can include an acrylonitrile content from about 30% to about 45%.

The amount (i.e., weight percent, or "wt %") of compatibilizing agent with respect to the weight sum of components (i), (ii), and (iii) or with respect to the weight of the final polymer blend can be any suitable amount that achieves the desired mechanical properties of the blend, but typically no more than about 1 wt %, 3 wt %, 5 wt %, 7 wt %, 10 wt %, 12 wt %, 15 wt %, 20, or 25 wt %. In other examples, the compatibilizing agent can be in an amount of precisely, about, at least, up to, or less than, for example, 0.5 wt %, 1.0 wt %, 1.5 wt %, 2.0 wt %, 2.5 wt %, 3.0 wt, 3.5 wt %, 4.0 wt %, 4.5 wt %, 5.0 wt %, 5.5 wt %, 6.0 wt %, 6.5 wt %, 7.0 wt %, 7.5 wt %, 8.0 wt %, 8.5 wt %, 9.0 wt %, 9.5 wt %, 10.5 wt % 15 wt %, 20 wt %, or 25 wt %, or in an amount within a range bounded by any two of the foregoing values. In one example, the weight of ABS present in the blend is greater than the weight of lignin present in the blend. In one example, the weight of ABS present in the blend is greater than the combined weight of lignin and compatibilizing agent present in the blend.

Impact strength of the presently disclosed polymer blends depends on its ability to develop an internal force multiplied by the deformation as a result of impact. The impact strength is dependent on the shape of a part prepared from the presently disclosed polymer blends, which, can enhance its ability to absorb impact. The presently disclosed polymer blends and articles made therefrom containing at least components (i), (ii), and (iii) is envisioned to possesses an impact strength of 5 kJ/m$^2$ or greater, (notched Izod, according to ASTM D256), a tensile strength of at least or above 1 MPa, when the composition is free from solvents or not substantially solvated, and more preferably at least or above 10, 15, 20, or 30 MPa.

The polymer blend material and articles made therefrom containing at least components (i), (ii), and (iii) preferably possesses an elongation at break of at greater than 2%. In one example, an elongation at break of greater than 2%, 3%, 4%, 5%, 6%, 7%, 8%, 9%, or 10% or greater.

In another aspect, the instant disclosure is directed to methods for producing the polymer blend material described above. In the method, the components (i), (ii), and (iii) are mixed and homogeneously blended to form the polymer blend material. Any one of the components (i), (ii), and/or (iii) can be included in liquid form (if applicable), in solution form, or in particulate form. In the case of particles, the particles may be, independently, nanoparticles (e.g., at least 1, 2, 5, or 10 nm, and up to 20, 50, 100, 200, or 500 nm), microparticles (e.g., at least 1, 2, 5, or 10 μm, and up to 20, 50, 100, 200, or 500 μm), or macroparticles (e.g., above 500 μm, or at least or up to 1, 2, 5, 25, 50, or 100 mm). Typically, if any of the components (i)-(iii) is provided in particle form, the polymeric particles are melted or softened by appropriate heating to allow homogeneous blending of polymers and uniform dispersion of particles. The components can be homogeneously blended by any of the methodologies known in the art for achieving homogeneous blends of solid, semi-solid, gel, paste, or liquid mixtures. Some examples of applicable blending processes include simple or high speed mixing, compounding, extrusion, or ball mixing, all of which are well-known in the art.

By being "homogeneously blended" is meant that, in macro (e.g., millimeter) scale, no discernible regions of at least components (i) and (ii) exist, although discernible regions of component (iii) may or may not exist. One or more of the components remains as solid phase, either in the elemental state or in the crystalline lamella phase. In other words, the homogeneous blend possesses a modified or compatibilized phase structure (not necessarily a single phase structure, but often with retained but shifted glass transition temperature (Tg) associated with individual phases) for at least components (i) and (ii). The modified-phase structure generally indicates near homogeneous integration at micro-scale or near the molecular level without losing each component's identity.

A component other than component (i), (ii), or (iii) may be present in homogeneous or non-homogeneous form. In the case of an additional non-homogeneous component, the instantly described polymer blend having components (i), (ii), and (iii) can be considered a "homogeneous matrix" in which the additional non-homogeneous component is incorporated. Preferably, all of the components retain their segmental identity and components are well dispersed in the nanometer scale. In that case, component (i) provides impact resistance or toughness, component (ii) provides rigidity, and component (iii) provides some level of synergy in the interaction between phases (i) and (ii). For example, compatibilizing agent (component (iii), in one example, functions as an interfacial adhesion promoter and/or materials performance enhancer.

The presently disclosed polymer blend material is typically subjected to a shape-forming process to produce a desired shaped article. The shape-forming process can include, for example, molding (e.g., pour, injection, or compression molding), extrusion, melt-spinning, melt pressing, or stamping, all of which are well known in the art.

The article containing the polymer blend described above is one in which some degree of impact strength and toughness is provided, along with high mechanical strength. The blend can be further reinforced with, for example, carbon, ceramic, glass, or metallic fibers to produce composite parts. The article may be used as or included in any useful component, such as a structural support, the interior or exterior of an automobile, furniture, a tool or utensil, or a high strength sheet or plate.

The following examples are provided as exemplary and are not to be used to limit the scope of any of the claims.
Prophetic Examples Preparation: The acrylonitrile-butadiene-styrene resin and the compatibilizer is to be dried per the manufacturer's suggestion. The lignin is to be dried overnight at 80° C. The lignin and compatibilizer are mixed by hand. A Brabender 3-piece mixer is heated to 190° C. The ABS resin is added to the mixer and mixed at 50 rpm until softened. The lignin/compatibilizer blend is added to the mixer and mixing is continued for 10 minutes to produce the final composite.
Test Specimen Preparation:

A press is heated to 190° C. A plate mold is placed into the hot press and filled with the appropriate amount of the composite to produce a plaque 4 mm thick. The top plate is placed in the mold and the press is gently closed to allow the top platen of the press to contact the top plate of the mold. After the temperature is allowed to equalize, the sample is pressed with 20 tons of pressure for 10 minutes to provide a pressure of approximately 278 psi to the sample. At the end of the press cycle the heat is turned off and the press allowed to cool to room temperature. After cooling the plaque is removed from the mold and test specimens (Notched Izod notched impact per ASTM D256, and tensile dog bones per ISO 527-1 and 527-2 Specimen A) are machined from the plaque. Table 1 presents presently disclosed compositions.

TABLE 1

ABS/Lignin blend compositions.

| SAMPLE | Wt. ABS | Wt. Lignin | Wt./Compatibilizing Agent |
|---|---|---|---|
| 1 | 75 g | 25 g | Comparative Example |
| 2 | 75 g | 25 g | 1 g Polyethylene oxide; MW > 100K |
| 3 | 75 g | 25 g | 5 g Polyethylene oxide; MW > 100K |
| 4 | 75 g | 25 g | 5 g polyvinyl alcohol |
| 5 | 75 g | 25 g | 5 g polyvinyl acetate |
| 6 | 75 g | 25 g | 5 g ethylene vinylacetate copolymer |
| 7 | 75 g | 25 g | 5 g ethylene-vinyl acetate-carbon monoxide copolymer |
| 8 | 75 g | 25 g | 5 g styrene-maleic anhydride copolymer |
| 9 | 75 g | 25 g | 5 g maleic anhydride grafted acrylonitrile-butadiene-styrene copolymer |
| 10 | 90 g | 10 g | 1 g Polyethylene oxide; MW > 100K |
| 11 | 90 g | 10 g | 5 g Polyethylene oxide; MW > 100K |
| 12 | 90 g | 10 g | 5 g polyvinyl alcohol |
| 13 | 90 g | 10 g | 5 g polyvinyl acetate |
| 14 | 90 g | 10 g | 5 g ethylene vinylacetate copolymer |
| 15 | 90 g | 10 g | 5 g ethylene-vinyl acetate-carbon monoxide copolymer |
| 16 | 90 g | 10 g | 5 g styrene-maleic anhydride copolymer |
| 17 | 90 g | 10 g | 5 g maleic anhydride grafted acrylonitrile-butadiene-styrene copolymer |
| 18 | 90 g | 10 g | 5 g acrylonitrile-butadiene copolymer |
| 19 | 65 g | 35 g | 1 g Polyethylene oxide; MW > 100K |
| 20 | 65 g | 35 g | 5 g Polyethylene oxide; MW > 100K |
| 21 | 65 g | 35 g | 5 g polyvinyl alcohol |
| 22 | 65 g | 35 g | 5 g polyvinyl acetate |
| 23 | 65 g | 35 g | 5 g ethylene vinylacetate copolymer |
| 24 | 65 g | 35 g | 5 g ethylene-vinyl acetate-carbon monoxide copolymer |
| 25 | 65 g | 35 g | 5 g styrene-maleic anhydride copolymer |
| 26 | 65 g | 35 g | 5 g maleic anhydride grafted acrylonitrile-butadiene-styrene copolymer |
| 27 | 65 g | 35 g | 5 g acrylonitrile-butadiene copolymer |
| 28 | 80 g | 20 g | 1 g Polyethylene oxide; MW > 100K |
| 29 | 80 g | 20 g | 5 g Polyethylene oxide; MW > 100K |
| 30 | 80 g | 20 g | 5 g polyvinyl alcohol |
| 31 | 80 g | 20 g | 5 g polyvinyl acetate |
| 32 | 80 g | 20 g | 5 g ethylene vinylacetate copolymer |
| 33 | 80 g | 20 g | 5 g ethylene-vinyl acetate-carbon monoxide copolymer |
| 34 | 80 g | 20 g | 5 g styrene-maleic anhydride copolymer |
| 35 | 80 g | 20 g | 5 g maleic anhydride grafted acrylonitrile-butadiene-styrene copolymer |
| 36 | 80 g | 20 g | 5 g acrylonitrile-butadiene copolymer |
| 37 | 55 g | 25 g | 10 g ABS with >50% butadiene by weight, 5 g acrylonitrile-butadiene copolymer, 5 g polyethylene glycol with a molecular weight of 20,000 |
| 38 | 55 g | 25 g | 10 g ABS with >50% butadiene by weight, 5 g acrylonitrile-butadiene copolymer, 5 g maleic anhydride |
| 39 | 60 g | 25 g | 10 g ABS with >50% butadiene by weight, 5 g acrylonitrile-butadiene copolymer |

Expected Results:

Using the presently disclosed method, articles formed from melt blending an amount of thermoplastic acrylonitrile-butadiene-styrene (ABS) copolymer; an amount of lignin; and at least one compatibilizing agent so as to form a substantially homogeneous blend; can result in articles having improved improving and/or impact strength and/or elongation at break compared to an article made from the same ABS copolymer and the same lignin, at the same relative ratios, respectively, without the presence of the compatibilizing agent. Articles prepared using the compositions and methods disclosed herein can have at least 50% greater impact strength and 50% greater elongation at break than an article made from the same ABS copolymer and the same lignin, at the same relative ratios, respectively, without the presence of the compatibilizing agent.

Impact Strength: The impact strength will be determined on each sample (5 replicates) per ASTM D256. The ABS/lignin polymer article of comparative example 1 can have an Izod single notched impact strength of approximately 2 kJ/m$^2$. The various compatibilized ABS/lignin polymer articles of one or more of Examples 2-36 can have Izod single notched impact strengths of at least 3 kJ/m$^2$ or greater.

Elongation at break (ductility): The elongation at break for each sample (5 replicates) will be determined per ISO 527-1 and 527-2. The ABS/Lignin polymer composite of Comparative Example 1 can have an elongation at break of approximately 1.6%. The various compatibilized ABS/lignin polymer blend articles of one or more Examples 2-36 can have elongations to break greater than at least 2%.

Actual Example 75 parts of ABS resin, 20 parts of switchgrass, 5 parts of polyethylene oxide with an average molecular weight (Mw) of 100,000 and 5 parts of acetonitrile-butadiene copolymer rubber were blended per the method described above to form a compatibilized ABS-lignin copolymer composite. The composite sample was molded into a plaque and tensile "dogbones" were machined from the plaque. Tensile elongation at break was measured and determined to be 4.4% (average of 5 samples).

While the present invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. Thus, the invention in its broader aspects is therefore not limited to the specific details, representative apparatus and method, and illustrative examples shown and described. Accordingly, departures may be made from such details without departing from the spirit or scope of applicant's general inventive concept.

What is claimed is:

1. A thermoplastic acrylonitrile-butadiene-styrene copolymer/lignin blend comprising:
   (i) an amount of lignin, wherein the lignin is derived from a lignocellulosic feedstock, and wherein the lignin has been isolated from the lignocellulosic feedstock;
   (ii) an amount of a first acrylonitrile-butadiene-styrene copolymer; and
   (iii) an amount of compatibilizing agent, the compatibilizing agent including a first amount of a second acrylonitrile-butadiene-styrene copolymer having a butadiene content of at least about 50% by weight, which is a different copolymer than the first acrylonitrile-butadiene-styrene copolymer, and a second amount of a monomeric maleic anhydride, wherein the second acrylonitrile-butadiene-styrene copolymer and the monomeric maleic anhydride are separate compounds within the blend,
   wherein the lignin is present in an amount of at least 5 wt % by total weight of components (i) and (ii), components (i) and (ii) are present together in an amount from 75 wt % or greater by weight of the total weight of the blend, and the total amount of the compatibilizing agent comprises from about 0.5 to 25% by weight of the total weight of the blend.

2. The blend of claim 1, wherein the lignin is a Kraft lignin.

3. The blend of claim 1, wherein the lignin is an organosolv lignin.

4. The blend of claim 1 wherein the compatibilizing agent further includes a copolymer of acrylonitrile and butadiene.

5. The blend of claim 4, wherein the compatibilizing agent is a copolymer of acrylonitrile and butadiene, the second acrylonitirile butadiene styrene copolymer having a butadiene content of at least about 50% by weight, and maleic anhydride.

6. A composite article comprising the acrylonitrile-butadiene-styrene copolymer/lignin blend of claim 1.

7. The blend of claim 1 wherein the lignocellulosic feedstock is selected from a lignocellulosic hardwood feedstock.

8. The blend of claim 1 wherein the lignin is selected from a Kraft lignin, a sulfite lignin, or a sulfur-free lignin.

9. A method for preparing a thermoplastic acrylonitrile-butadiene-styrene/lignin copolymer composite comprising:
   melt blending i) a first thermoplastic acrylonitrile-butadiene-styrene (ABS) copolymer, ii) lignin, wherein the lignin is derived from a lignocellulosic feedstock, and wherein the lignin has been isolated from the lignocellulosic feedstock, and iii) a compatibilizing agent, the compatibilizing agent including a second acrylonitrile-butadiene-styrene copolymer having a butadiene content of at least about 50% by weight, which is a different copolymer than the first acrylonitrile-butadiene-styrene copolymer, and a monomeric maleic anhydride;
   forming a substantially homogeneous blend of (i)-(iii), wherein the second acrylonitrile-butadiene-styrene copolymer and the monomeric maleic anhydride are separate compounds within the blend, and components (i) and (ii) are present together in an amount from 75 wt % or greater by weight of the total weight of the blend; and
   forming a composite article from the substantially homogeneous blend, wherein the composite article has an impact strength of at least 2 kJ/m$^2$ and/or an elongation at break of at least 2%.

10. The method of claim 9, wherein the lignin is a Kraft lignin or an organosolv lignin.

11. The method of claim 9, wherein the compatibilizing agent further includes a copolymer of acrylonitrile and butadiene.

12. The method of claim 11, wherein the compatibilizing agent is a copolymer of acrylonitrile and butadiene, the second acrylonitirile butadiene styrene copolymer having a butadiene content of at least about 50% by weight, and maleic anhydride.

13. The method of claim 9, wherein the lignin is present in an amount of at least 5 wt % by total weight of components (i) and (ii).

14. The method of claim 9, wherein the compatibilizing agent comprises from about 0.5 to 25% by weight of the total weight of the blend.

15. A composite article manufactured according to the method of claim 9.

16. A thermoplastic acrylonitrile-butadiene-styrene copolymer/lignin blend comprising:
   (i) an amount of lignin, wherein the lignin is a Kraft lignin derived from a lignocellulosic feedstock, and wherein the Kraft lignin has been isolated from the lignocellulosic feedstock;
   (ii) an amount of a first acrylonitrile-butadiene-styrene copolymer; and
   (iii) an amount of compatibilizing agent, the compatibilizing agent including a first amount of a second acrylonitrile-butadiene-styrene copolymer having a butadiene content of at least about 50% by weight, which is a different copolymer than the first acrylonitrile-butadiene-styrene copolymer, and a second amount of a monomeric maleic anhydride, wherein the second acrylonitrile-butadiene-styrene copolymer and the monomeric maleic anhydride are separate compounds within the blend,
   wherein the lignin is present in an amount from about 15 to 50 wt % by total weight of components (i) and (ii), components (i) and (ii) are present together in an amount from 75 wt % or greater by weight of the total weight of the blend, and the total amount of the compatibilizing agent comprises from about 5 to 25% by weight of the total weight of the blend.

* * * * *